Feb. 6, 1934. H. CHIREIX 1,946,308
APPARATUS FOR RADIOCOMMUNICATION
Filed July 19, 1932   3 Sheets-Sheet 1
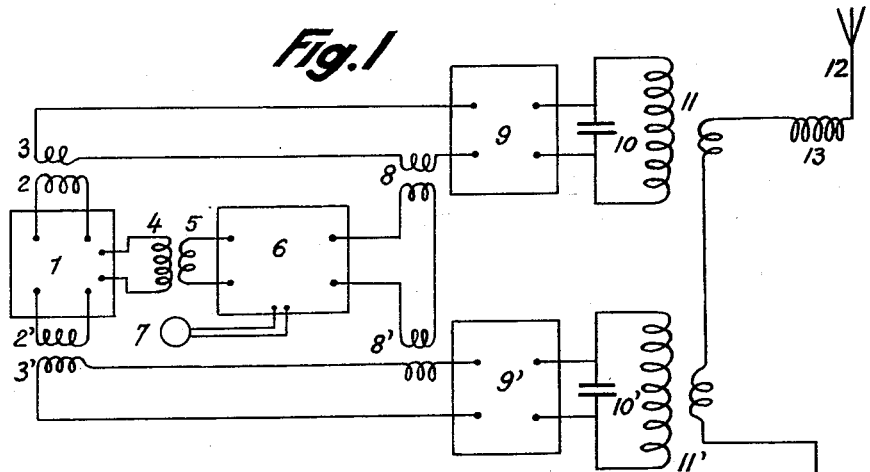
*Fig. 1*
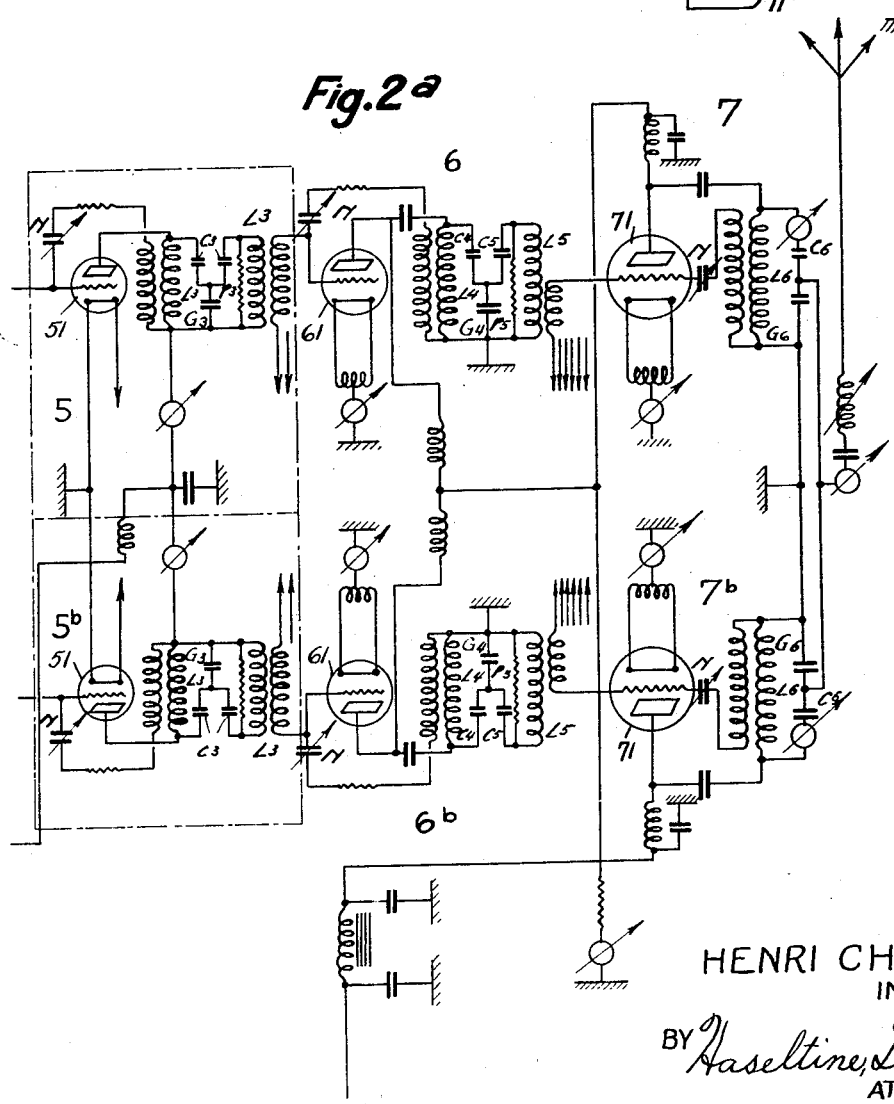
*Fig. 2ª*
HENRI CHIREIX
INVENTOR
BY Haseltine, Lake & Co.
ATTORNEYS Feb. 6, 1934.   H. CHIREIX   1,946,308
APPARATUS FOR RADIOCOMMUNICATION
Filed July 19, 1932   3 Sheets-Sheet 3
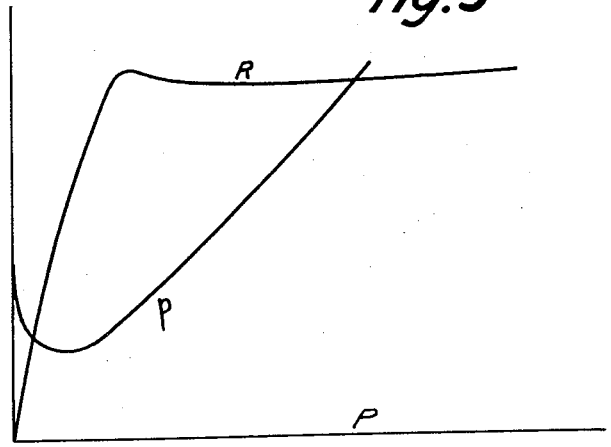
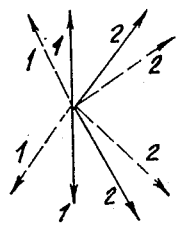
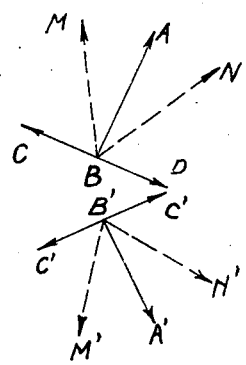
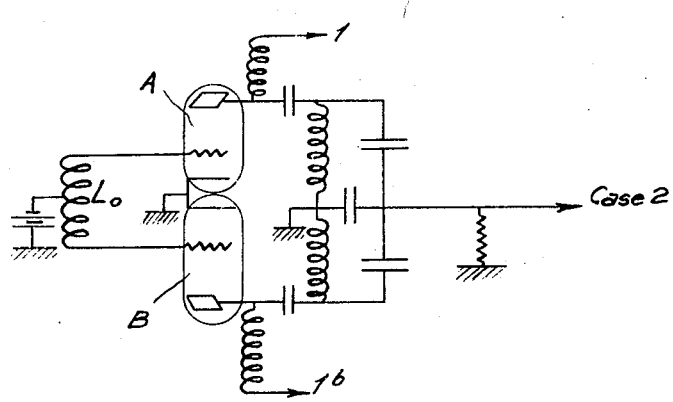
HENRI CHIREIX
INVENTOR
BY Haseltine, Lake & Co.
ATTORNEYS Patented Feb. 6, 1934

1,946,308

UNITED STATES PATENT OFFICE 1,946,308

APPARATUS FOR RADIOCOMMUNICATION

Henri Chireix, Paris, France

Application July 19, 1932, Serial No. 623,333, and in France July 29, 1931

3 Claims. (Cl. 250—17)

The present invention relates to emitters of waves modulated in amplitude obtained by the superimposition in differential connection of two waves having a practically fixed amplitude, the phase of which varies according to the cadence of the modulation. Each of these waves is composed of two components in quadratic relationship, one only of which is modulated in amplitude.

These emitters have been described in my applications Serial No. 189,206 and Serial No. 533,674, now Patents Nos. 1,882,119 dated October 11, 1932 and 1,892,383 dated December 27, 1932, respectively. The object of the present invention is to specify the conditions for the control of the emitters provided in accordance with the above applications and, on the other hand, to provide a modulating system by which a maximum of efficiency is obtained.

In order that the invention may be fully understood, reference is directed to the accompanying drawings, in which:—

Figure 1 represents the circuit diagram embodying the principle of the emitter and corresponds to Figure 2 of the drawings of application Serial No. 189,206.

Figures 2 and 2a represent a modification of the circuit employing this principle and correspond to the figures of the drawings of application Serial No. 533,674.

Figure 3 represents the characteristic curves of the emitter in accordance with the invention.

Figures 4 and 5 represent the vector diagrams of the potentials of excitation of the different valves employed in the system, and Figure 6 represents an arrangement of the modulator in accordance with the present invention.

Figure 2:
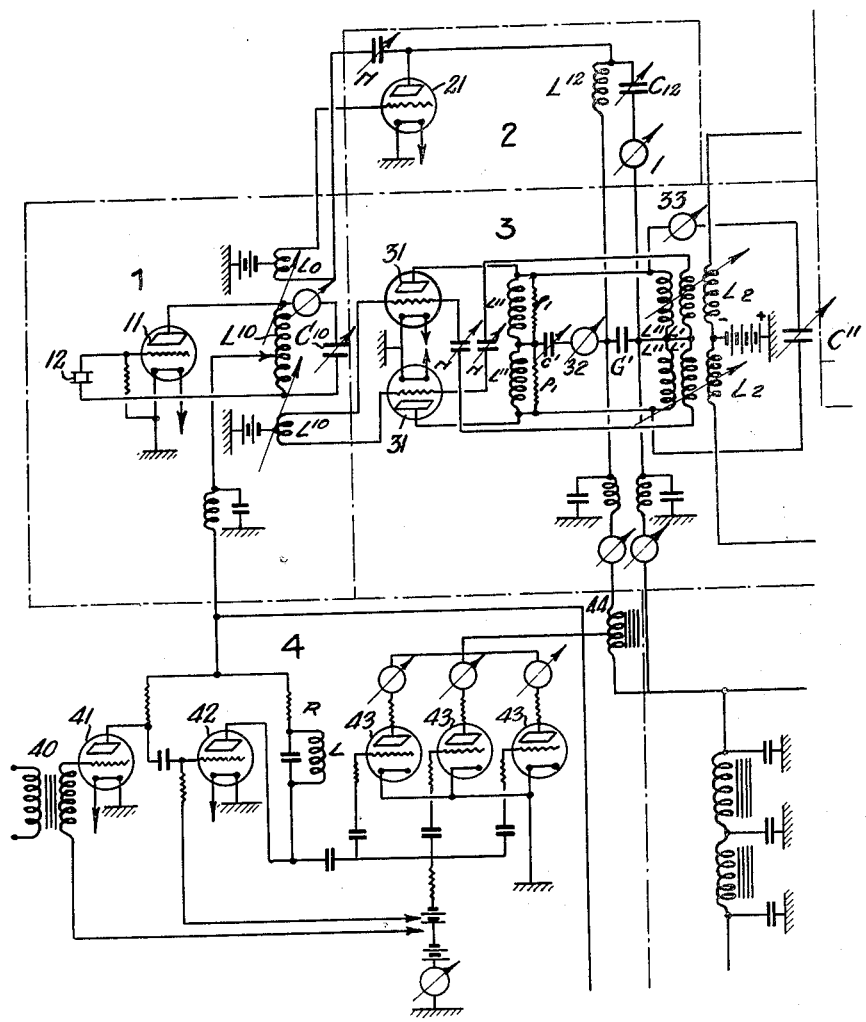

Referring now particularly to Figure 1, the reference 1 stands for the radio frequency generator, 2, 3, and 2', 3' for two transformers arranged in such a way that the electro-motive forces induced in the secondaries 3 and 3' are in phase opposition. 4 and 5 are primary and secondary windings of another transformer so arranged that the secondary electro-motive force induced in 5 is in quadrature relationship with the electro-motive forces induced in 3 and 3'. 6 denotes a complete tube modulator assembly combined with a microphone 7. In the operation of said modulator outfit recourse may be had, for instance, to the well-known method known as the constant-current or plate-control system. In short, at the output end of device 6 there results a radio frequency potential modulated by speech and in quadrature relation with the electro-motive force induced by the transformers 2, 3, and 2', 3'. 8 and 8' represent two transformers connected with the output end of the tube modulator 6, while 9 and 9' stand for two amplifiers which are excited, as has already been shown, by currents of constant or practically constant amplitude, but of a phase subject to variation by speech. 10 and 10' are two oscillation circuits at the output end of the said amplifiers, and 11 and 11' are two couplings with the antenna circuit represented at 12 and tuned by the agency of inductance coil 13. The total electro-motive force induced in the antenna by the two couplings 11 and 11' varies with the phase displacement angle between the two electro-motive forces induced separately by 11 and 11', and the antenna current will naturally vary in proportion with the total electro-motive force induced, while, on the other hand, if all conditions are symmetrical, the phase angle between the electro-motive forces 11 and 11' will be identical to that existing between the currents of the secondary circuits 3, 8, 9 and 3', 8' and 9'.

As may be readily observed upon inspection, Figure 2 proper has been divided into two halves, the left half being noted Figure 2, and the right half Figure 2a. These halves are subdivided upon each of the two drawings into separate sections by dotted lines, each section diagrammatically including a group assembly of the apparatus to which a definite function can be ascribed. Thus, section 1 contains the carrier wave generator, section 2 the source producing the modulated current, section 3 the coupling device with amplifier, section 4 the modulator, sections 5 and 5b the low energy amplifiers, sections 6 and 6b the intermediate energy amplifiers, and sections 7 and 7b the high energy amplifiers.

Heretofore, it has been known to transmit a modulated wave in accordance with the following method.

By means of a generator, carrier waves are produced consisting of a first unmodulated wave and a second wave of the same frequency and in phase quadrature with the first mentioned wave. By modulating the amplitude of this second wave, a resultant wave can be obtained having a single modulated phase of an amplitude which remains practically constant. In an arrangement for producing two resultant waves of this sort, shiftable in phase over a certain angle, whereby the variations in phases due to the modulation is symmetrically effected with respect to the bisection of this angle, then by superposing these waves in opposition, it is possible to obtain a wave with modulated amplitude which can be transmitted over the antenna. Before the superposition takes place, each phase modulated wave can of course be amplified by an independent amplifier having a number of desired stages.

Referring now to section 1, a master oscillator 11 is provided, which is stabilized by a quartz crystal 12, the currents being generated in the oscillating circuit $L_{10}$ $C_{10}$.

In section 3 an equilibrated Wheatstone bridge is provided including four self inductances $L_{11}$, $L_{11}$, etc. A condenser $C^{11}$ in series with an ammeter 33 constitutes one diagonal of the bridge. Another diagonal includes the condenser $C^1$, the ammeter 32, and the coupling condenser $G^1$. Two of the self inductances $L_{11}$ are shunted by fixed resistances P1 while the other two self inductances are shunted by the internal resistances of two tubes 31, arranged in push-pull. These two tubes serve to affect one diagonal of the bridge by means of pure carrier waves from the master oscillator 11 through the intermediate action of the variable coupling $L^1O$.

The other diagonal of the Wheatstone bridge is influenced indirectly by the same master oscillator 11 through the intermediate action of the variable coupling $L_0$ of the tube 21 provided in section 2 and the circuit of $L_{12}$, $C_{12}$ which are connected to the terminals of condenser $G_1$.

The plate current of tube 21 is modulated according to above method by controlling the anode by means of the modulator of section 4, which includes, for example, an input transformer 40, a cascade of amplifiers 41, 42, 43 (the last stage being one of high energy), and a branch containing an iron self inductance or choke 44 provided between the plates of the last stage and one terminal of the condenser $G_1$.

The output voltages of the Wheatstone bridge are transmitted by the intermediate coil $L_2$ to the input of the amplifiers 51 of sections 5 and 5b, and the currents therefrom are amplified respectively by the tubes 61 of sections 6 and 6b, each tube 61 preferably representing two tubes connected in parallel, and finally in the stages of the stages 7 and 7b, the amplification takes place in the tubes 71, each tube designating in schematic manner six tubes connected in parallel. The output terminals of the stages 7 and 7b are symmetrically connected and the antenna 8 is connected to the center point of the common circuit thus formed.

Referring to Figures 1, 2 and 2a, it will be seen that when the potentials developed at the terminals of the output oscillatory circuits (10, 10' of Figure 1, $L_6$, $C_6$, $α_6$ of Figures 2 and 2a) are exactly opposed, the charge in the presupposed aerial circuit is nil and increases as the angle of phase of these potentials decreases. Calculation and experience show that this charge in each of the circuits is comprised:—

(1) by a watted component, (2) by a reactive component, the effect of which is to detune one of the circuits to above and the other to below the carrier frequency.

With a view to obtaining the maximum efficiency from the station on any particular power system, for example on the carrier wave system, there is, however, advantage in detuning the circuits 10 and 10' or $L_6$, $C_6$, $α_6$ above referred to, one above and the other below carrier frequency; the dewatted power is thus compensated. In bringing about this detuning, the compensation may, for example, be obtained when the two potentials developed at the terminals of the output circuits form an angle of 150° or 140° to one another. Thus, if the curves for the absorbed power are plotted by the power stage (p) as a function of the useful power (P) acting in the aerial, or also the curves of efficiency (R) are plotted, results are obtained as indicated in Figure 3. For the direct phase opposition of the output potentials, the absorbed power is not nil (owing to the initial detuning); on the other hand, however, the useful power is nil; therefore the efficiency is nil. As the angle of phase diminishes the absorbed power decreases and the useful power increases, and the efficiency increases very rapidly. As this angle constantly diminishes, the absorbed power falls to a minimum and increases anew, the useful power always increasing and the efficiency continues to increase. For phase displacement corresponding to the compensation selected, the efficiency is maximum. Furthermore, for potentials developed presenting a smaller phase angle, the absorbed power and the useful power continue to increase and the efficiency after having slightly diminished is maintained practically constant at a high level.

This arises from the fact that although the compensation is no longer perfect, the reactive component weakens before the active component due to the charge does so.

Of course, the question of determining which of the two circuits 10 or 10' or $L_6$, $C_6$, $α_6$ must be detuned towards a particular lower frequency, is, for example, resolved in the direction in which the vectors of excitation are caused to turn. In particular, it is found in the case of the arrangement as given in the Figures 2 and 2a, that the circuit, the excitation of which is caused to advance in order to obtain charges of higher value, must be regulated to a particular lower frequency whilst the circuit on which retardation should occur under the same conditions should be regulated to a particular higher frequency.

Another result of initial detuning which it is advantageous to introduce, is that the variation in phase of the grid excitations necessary in order to pass from the zero power value to the maximum power value, that is to say in order to bring about a predetermined variation in phase of the potentials developed between the output oscillatory circuits, is notably greater than this latter variation, and that in particular it is necessary, in order to obtain the opposition of the potentials in the output circuit, to displace the phase of the grid excitations at a lesser angle than that corresponding to the opposition of phase and in the opposite direction of the charge. Figure 4 indicates, for example, the phase relations to be obtained for the zero charge (1) and the maximum charge (2), the dotted lines relating to the excitations of the last stage and the unbroken lines to the potentials developed in the output circuits.

The cause resides in the fact that the internal resistance of the tubes introduces a phase displacement between the exciting potential and the output potential, inasmuch as the supply circuit does not function as a pure resistance.

In order to attain, in particular, zero power (with the arrangement as indicated in Figures 2 and 2a), the circuits of the intermediate stages 5, 5b, 6, 6b must be tuned in such a manner as to bring about initial phase displacements, whereby in the absence of the modulated excitation arising from the unit 2 (the tube being removed, for example), a zero charge exists in the aerial. Whilst operating, for example, under the action of a strong modulation effected on the tube of the unit 2, the modulation involving, substantially instantaneously, the nullification of the high frequency current in the oscillatory circuit of the unit 2, the grid excitations and also the potentials developed at the terminals of the output circuits will be defined by all the positions embraced by the vectors shown in Figure 4.

It might be more advantageous and more in accord with the diagram given by way of example in Figures 2 and 2a, to interpose between the main oscillator and the unit 2 a balanced modulator in which the carrier wave is suppressed, that is to say, a potential is supplied of the form:

A $\cos \omega t \cos \Omega t$ instead of A $\cos \omega t$ $(1+K \cos \Omega t)$ in which expressions $\omega$ and $\Omega$ represent respectively the periodicity of the high frequency and low frequency waves.

Actually, in this case, the oscillatory circuit of the unit 2 is not traversed by any current in the absence of telephonic modulation and when the said modulation appears, the phase of the high frequency current varies inversely with the low frequency alternation; the result is that (referring to Figure 5) the grid excitation of one of the power amplifiers will vary from BA, in the absence of modulation, to BM and BN for a certain degree of modulation (BM and BN being symmetrical in relation to BA). Moreover, the excitation of the grid of the other power amplifier varies from BM' to BN'.

In this case the initial lag, that is to say, the lag produced in the absence of modulation will be so selected that the power of the carrier wave is attained and regulated to this value whilst, as above stated, a tuning of the circuits of the intermediate stages, is effected.

The balanced modulator between the unit 1 and the unit 2 (Figures 2 and 2a) may be arranged according to the circuit shown in Figure 6 in which 1 represents an anode supply with potential varying with the modulation and 1b an anode supply with a fixed potential pertaining respectively to the triode tubes A and B. The grid circuits and the anodes of these tubes will be constituted as indicated by inductances and capacities symmetrically disposed, the central point of the anode circuits being connected to the input conductor of the unit 2.

Of course, in this case, the unit 2 has its anode supply arranged at a fixed potential.

The invention is capable of various modifications according to the particular arrangements which might be adopted by the expert in order to conform to the principles which it demonstrates.

What I claim and desire to secure by Letters Patent is:—

1. Apparatus for the emission of electric waves modulated in amplitude comprising a source of electrical energy having a carrier frequency, two differential circuits comprising at their output portions two oscillatory circuits, one of which is detuned below the carrier frequency while the other is detuned above said carrier frequency, each of said differential circuits being arranged to carry a portion of the non-modulated energy of the said source, of means for diverting another portion of said energy and for transforming its phase in quadratic relationship to that of the energy of the said source, of means for modulating in amplitude the said energy transformed in quadratic relationship, of means for superimposing the modulated energy on that which is non-modulated in the differential circuits and a common output circuit coupled to said oscillatory circuits so as to produce an emitted wave of modulated amplitude.

2. Apparatus for the emission of electric waves modulated in amplitude comprising a source of electrical energy having a carrier frequency, two differential circuits comprising at their output portions two oscillatory circuits, one of which is detuned below the carrier frequency while the other is detuned above said carrier frequency, each of said differential circuits being arranged to carry a portion of the non-modulated energy of the said source, of means for displacing the phase of each of said non-modulated portions respectively one advanced and the other retarded in relation to the phase of the energy of the said source, of means for diverting another portion of said energy and for transforming its phase in quadratic relationship to that of the energy of the said source, of means for modulating in amplitude the quadratically transformed energy, of means for suppressing the carrier wave of the modulated energy, of means for superimposing the carrier wave on the non-modulated energy in the differential circuits, and a common output circuit coupled with said oscillatory circuits so as to produce an emitted wave of modulated amplitude.

3. Apparatus for the emission of electric waves modulated in amplitude comprising a source of electrical energy having a carrier frequency, two differential circuits comprising at their output portions two oscillatory circuits, one of which is detuned below the carrier frequency while the other is detuned above said carrier frequency, each of said differential circuits being arranged to carry a portion of the non-modulated energy of the said source, of means for diverting another portion of said energy and for transforming its phase in quadratic relationship with that of the energy of the said source, of means for modulating in amplitude the energy transformed in quadratic relationship comprising a stage composed of two push-pull electron tubes, the potential of one of said tubes being modulated in such a manner as to suppress the carrier wave of the modulated energy, of means for superimposing the modulated energy on that which is not modulated in the differential circuits and a common output circuit coupled with said oscillatory circuits so as to produce an emitted wave of modulated amplitude.

HENRI CHIREIX.